(12) United States Patent
Kweldam

(10) Patent No.: US 7,998,518 B2
(45) Date of Patent: Aug. 16, 2011

(54) METHOD FOR THE PREPARATION OF A MEAT SUBSTITUTE PRODUCT, MEAT SUBSTITUTE PRODUCT OBTAINED WITH THE METHOD AND READY TO CONSUME MEAT SUBSTITUTE PRODUCT

(75) Inventor: Adriaan Cornelis Kweldam, Heiloo (NL)

(73) Assignee: NUG Nahrungs- und Genussmittel Vertriebsgesellschaft mbH, Waiblingen (DE)

( * ) Notice: Subject to any disclaimer, the term of this patent is extended or adjusted under 35 U.S.C. 154(b) by 2047 days.

(21) Appl. No.: 10/502,108

(22) PCT Filed: Sep. 17, 2002

(86) PCT No.: PCT/NL02/00594
§ 371 (c)(1),
(2), (4) Date: Dec. 27, 2004

(87) PCT Pub. No.: WO03/061400
PCT Pub. Date: Jul. 31, 2003

(65) Prior Publication Data
US 2005/0112268 A1    May 26, 2005

(30) Foreign Application Priority Data
Jan. 22, 2002 (NL) .................................... 1019816

(51) Int. Cl.
*A23L 1/31* (2006.01)

(52) U.S. Cl. .......................................................... 426/574
(58) Field of Classification Search .................... 426/574
See application file for complete search history.

(56) References Cited

U.S. PATENT DOCUMENTS

| 3,093,483 A |   | 6/1963  | Ishley          |         |
|-------------|---|---------|-----------------|---------|
| 3,627,536 A | * | 12/1971 | Arima et al.    | 426/574 |
| 3,865,959 A |   | 2/1975  | Lecluse         |         |
| 4,118,520 A |   | 10/1978 | Visser et al.   |         |
| 4,423,083 A |   | 12/1983 | Shenouda        |         |
| 4,559,233 A |   | 12/1985 | Chen et al.     |         |
| 5,300,312 A | * | 4/1994  | Lusas et al.    | 426/634 |

FOREIGN PATENT DOCUMENTS

| NL | 1008364    | 11/1999 |
| WO | WO96/13177 | 5/1996  |

* cited by examiner

*Primary Examiner* — Kelly Bekker
(74) *Attorney, Agent, or Firm* — Thomas, Kayden, Horstemeyer & Risley, LLP

(57) ABSTRACT

The invention relates to a method for the preparation of a meat substitute product in which a protein, a hydrocolloid which precipitates with metal cations and water are mixed at elevated temperature until a homogenous mixture is formed. The mixture is mixed with a solution of a metal cation with a valency of at least 2 to form a fibrous product. The fibrous product is then obtained. The invention also describes the meat substitute product which is obtained with the aid of the method according to the invention.

20 Claims, No Drawings

METHOD FOR THE PREPARATION OF A MEAT SUBSTITUTE PRODUCT, MEAT SUBSTITUTE PRODUCT OBTAINED WITH THE METHOD AND READY TO CONSUME MEAT SUBSTITUTE PRODUCT

CROSS REFERENCE TO RELATED APPLICATION

This application claims priority to and the benefit of NL1019816 dated Jan. 22, 2002.

TECHNICAL FIELD

The invention relates to a method for the preparation of a meat substitute product which comprises protein, wherein:
1) a protein material, a hydrocolloid which precipitates with metal cations and water are added to one another,
2) the composition from step 1) is formed into a homogenous mixture,
3) the mixture from 2) is mixed with a solution of a metal cation with a valency of at least 2, in order to form a fibrous product,
4) the fibrous product is isolated.

BACKGROUND

The fibrous product, possibly after further processing, forms a meat substitute product.

A method of this type is known from NL-C-1008364, in the name of A. C. Kweldam.

The said patent describes a method of the type described in the introduction for processing non-animal proteins, such as proteins derived from soya, rice, maize and the like, to form meat substitutes. It is assumed that the homogenous mixture as described above contains complexes of protein and hydrocolloid which precipitates with metal cations, which are precipitated in the form of fibres on account of the addition of a solution of a metal cation with a valency of at least 2.

SUMMARY

The applicant has attempted to use the method described to convert milk protein or materials derived from milk protein into a fibrous meat substitute product.

In the method described, a homogenous mixture of protein, hydrocolloid which precipitates with metal cations and water is generally made by stirring at a temperature in the range from 20 to 90° C., more particularly from 30 to 90° C., and generally at a temperature of approximately 50° C.

At a slightly elevated temperature, the protein will melt and form a homogenous mixture with the hydrocolloid which precipitates with metal cations and water.

It should be noted that the term homogenous mixture in the present application is used to cover both emulsions, dispersions and solutions.

With some proteins, for example cheese milk protein, the use of an elevated temperature will lead to melting, with the result that the homogenous mixture is a distribution of two liquid materials which are not soluble in one another, i.e. an emulsion. With other milk proteins, there will be no melting, but rather dispersion or dissolution will take place.

In addition to the presence of organoleptic benefits, milk protein material is distinguished from vegetable protein through the absence of trypsin inhibitors (which are present in vegetable protein material, such as soya and maize) and a superior amino acid pattern. The PDCAAS (protein digestability corrected amino acid score) of protein from cow's milk is 1.21, while that of soya is 0.91 and that of wheat is 0.42. Normal beef has a score of 0.92; therefore, the milk protein material actually scores better than meat.

When the method described in the preamble is applied to milk protein or a material derived therefrom, the desired homogenous mixtures is not obtained or is difficult to obtain.

It is an object of the present invention to provide a solution to this drawback, and to this end the present invention is characterized in that the protein material comprises a milk protein material, and the mixture of protein material, hydrocolloid which precipitates with metal cations and water is formed in the presence of an amount of a phosphate material.

This is because one problem is that the free calcium ions which are naturally present in milk protein or materials derived therefrom or are added during processing may form a precipitate with the added hydrocolloid, which precipitates with metal cations, prematurely, which has a highly adverse effect on the further sequence of the method and may lead to a serious lack of uniformity in the finished product, if a usable end product can be obtained at all.

DETAILED DESCRIPTION

In the method according to the invention described above, the presence of a suitable amount of phosphate material means that a complex is formed with the free $Ca^{2+}$ ion content, with the result that there is no premature precipitation of the hydrocolloid used. A homogenous mixture is then obtained without problems.

In addition to having the effect of forming a complex with free calcium ions, phosphate also has a protein-digesting action. The protein-digesting action manifests itself, inter alia, in an improved water uptake and has a positive effect on the sensation in the mouth.

It is expedient firstly to make up a mixture of protein material and water and to add the phosphate material to this mixture. Then, the hydrocolloid which precipitates with metal cations with a valency of at least 2 is added, and the mixture is stirred until a homogenous mixture is obtained. In addition to stirring, it is also possible to use other distribution methods, such as homogenization, milling, dispersion and the like.

The method can be used, inter alia, with a number of milk protein materials which are isolated during cheesemaking, specifically cheese curd, cheese and cheese products; it is possible for materials such as powdered milk, sodium caseinate, calcium caseinate (generally alkali metal, akaline-earth metal and ammonium caseinate), whey protein, crosslinked caseine and the like to be processed.

Obviously, it is also possible to use mixtures of two or more protein materials to prepare a meat substitute product.

In a method which is directed at the processing of materials such as cheese curd and cheese, to prepare a meat substitute product the starting material is if desired converted into a finely distributed form (for example cheese is grated), and is mixed with water, hydrocolloid which precipitates with metal cations and phosphate material in an amount which is sufficient to form a complex with free calcium ions which are present. This is followed by extensive mixing to obtain a homogenous mixture.

The phosphate material makes it possible to form a homogenous mixture, such as an emulsion, from protein material, such as milk protein material, a hydrocolloid which precipitates with metal cations and water at elevated temperature.

The hydrocolloid which precipitates with metal cations, and is a polysaccharide, may be selected from pectin with a low methoxyl group content, Gellan gum and alginate; sodium alginate is preferred. There are numerous commercially available alginates; in the context of the invention, use is made of, for example, Ca-reactive alginates such as of the type obtained from "Brown algae".

If a solution of a metal cation with a valency of at least 2 is added to the homogenous mixture in which there are substantially no longer any free calcium ions and which contains complexes of milk protein material and a hydrocolloid which precipitates with metal cations of this type, a fibrous product will be obtained in a controlled way and, optionally after washing and removal of excess moisture, has a meat substitute structure.

In connection with the invention, reference is also made to U.S. Pat. No. 4,559,233.

The said patent describes the formation of a meat substitute starting from whey protein.

Whey protein/xanthan gum complexes, which are precipitated isoelectrically, are formed.

This publication does not describe the use of hydrocolloid which precipitates with metal cations, the formation of a complex between free calcium ions which are present and a phosphate material and the precipitation step using a solution of metal cations with a valency of at least 2.

In the present method, a solution of a metal cation with a valency $\geq 2$ is added to the homogenous mixture, after it has been formed, in order to form milk protein/hydrocolloid fibres, such as milk protein/alginate fibres.

The metal cation solution generally contains soluble calcium or magnesium salts or mixtures thereof. Suitable calcium salts are calcium chloride, calcium acetate and calcium gluconate.

The phosphate material which is to be used for milk protein material which contains free calcium ions is generally a phosphate material which is able to form a complex with metal cations with a valency of at least 2, such as calcium or magnesium, and is expediently selected from alkali metal and ammonium salts of phosphoric acid of polyphosphoric acid.

The phosphate material may, for example, be disodium hydrogen phosphate, trisodium phosphate or sodium hexametaphosphate.

The phosphate material may also be sodium polyphosphate $(NaPO_3)_n$ where n~25.

The amount of phosphate material to be used is at least sufficient to form a complex with the free calcium ions which are present. In view of the protein-digesting action of phosphate as described above, in certain cases an excess of phosphate may be desirable and will even be generally applied.

The phosphate material is expediently added in an amount from 0.1 to 1.5% by weight, based on the total of all the constituents of the homogenous mixture.

The salts, phosphates and the like which are to be used will in all cases be of a type and purity which are licensed for use in foodstuff.

With regard to the phosphate material which is used to form a complex with the free calcium ions, it should also be noted that this is a readily available material which offers advantages in terms of its price. However, other complex-forming agents are not ruled out; for example, if desired a known complex-forming agent such as EDTA of food-grade quality can also be used with the same effect. Other similar agents can also successfully be used.

The hydrocolloid which is sensitive to metal cations may be selected from the group described above; however, it is expedient for the hydrocolloid to be sodium alginate.

Examples of suitable alginates are DMB sodium alginate (Manugel) from Kelco and FD125 from Danisco Cultor. It is also possible to use other alginates which form a precipitate with metal cations.

During the formation of the meat substitute products according to the present invention, the pH of the homogenous mixture of protein, hydrocolloid which precipitates with metal cations and water is advantageously set to a value in the range from 4 to 7.

Where the pH lies within this range will be selected according to the structure type of the meat substitute material which it is desired to prepare.

For example, to prepare a meat-type structure starting from a milk protein material, the pH will be set to a value between 5.0 and 7.0.

In the context of the present invention, the term meat-type structure is understood as meaning a structure which corresponds to the structure of beef, pork or chicken.

If a fish-type structure is desired, starting from milk protein material, the pH is set to a value between 4.5 and 6.0.

Specific details of the meat- or fish-type structure can be produced by varying the quantity of hydrocolloid, such as sodium alginate, used and also the type of alginate and the amount of calcium chloride.

In general, it is also possible to add finishing materials; they are preferably added to the homogenous mixture of protein, hydrocolloid which precipitates with metal cations and water, which is formed at elevated temperature. The finishing material may be selected from a flavouring, a colouring, vegetable or animal fat, vegetable or animal proteins and/or mixtures of two or more of these materials. Obviously, it is also possible for finishing materials to be added and mixed in after the fibrous product has been formed.

In a number of specific embodiments in which different starting materials are used, the method as described takes the following form.

Firstly, to form a fibrous product starting from cheese curd;

identical quantities by weight of cheese curd and water at approximately 50° C. are mixed (total weight 2A) in the presence of 0.8-1.2% by weight, based on 2A, of sodium polyphosphate, 2.5-3.5% by weight, based on 2A, of sodium alginate, as well as water at approximately 50° C. in an amount by weight A, are added with stirring, the homogenous mixture formed is mixed with stirring with a 3-5% by weight strength $CaCl_2$ solution in an amount by weight A to form a fibrous product, after which the fibrous product formed is isolated and finished.

In another embodiment, to form a fibrous product starting from cheese:

identical quantities by weight of grated cheese and water at approximately 50° C. are mixed (total weight of 2B) in the presence of 0.8-1.2% by weight, based on 2B, of sodium polyphosphate, 2.5-3.5% by weight, based on 2B, of sodium alginate, as well as water at approximately 50° C. in an amount by weight B, are added with stirring, the homogenous mixture formed is mixed with stirring with a 3-5% by weight strength $CaCl_2$ solution in an amount by weight B to form a fibrous product, after which the fibrous product formed is isolated and finished.

In yet another embodiment, the formation of a fibrous product starting from sodium caseinate is characterized in that
- a 10-15% strength by weight solution of sodium caseinate in water is made (total weight C) in the presence of 0.2-0.4% by weight of sodium polyphosphate, based on C
- butter is added in an amount of 15-20% by weight, based on C,
- 3-5% by weight, based on C, of sodium alginate, as well as water at approximately 50° C. in an amount by weight of 80-95% by weight, based on C are added with stirring,
- the homogenous mixture formed is mixed with stirring with 3-5% strength by weight calcium chloride solution in an amount of 80-95% by weight, based on C, to form a fibrous product, and
- the fibrous product formed is isolated and finished.

In yet another embodiment, the method according to the invention is characterized in that, to form a fibrous product starting from whey protein
- a 15-20% strength by weight solution of whey protein in water is made (total weight D) in the presence of 0.2-0.4% by weight of sodium polyphosphate, based on D,
- butter is added in an amount of 12-18% by weight, based on D,
- 3-7% by weight, based on D, of sodium alginate, as well as water at approximately 50° C. in an amount of 80-85% by weight, based on D, are added with stirring, and
- the homogenous mixture formed is mixed with stirring with 3-5% strength by weight calcium chloride solution in an amount of 80-85% by weight, based on D to form a fibrous product,
- the fibrous product formed is isolated and finished.

According to the invention, to form a fibrous product starting from skimmed milk powder,
- a 25-35% strength by weight solution of skimmed milk powder in water (total weight E) is made in the presence of 0.5-1.0% by weight, based on E, of sodium polyphosphate,
- butter is added in an amount of 11-15% by weight, based on E,
- 4-6% by weight, based on E, of sodium alginate, as well as water at approximately 50% C in an amount by weight of 65-75%, based on E, are added with stirring,
- the homogenous mixture formed is mixed with stirring with a 3-5% strength by weight $CaCl_2$ solution in an amount by weight of 65-75%, based on E, to form a fibrous product,
- after which the fibrous product formed is isolated and finished.

In the specific embodiments given above, the quantities by weight and percentages are given as accurate numbers; however, it should be understood that deviations from these accurate values are permitted and that the values are intended to give an indication of the order of magnitude (by weight) of the materials with respect to one another.

As has been discussed above, when the method is carried out with a view to converting a milk protein material into a fibrous meat substitute product, without the presence of phosphate material, the homogenous mixture which is to be formed will not be formed or will only be formed with difficulty, since the calcium ions which are naturally present or are added during processing lead to premature precipitation of the hydrocolloid or polysaccharide used, resulting in a product with less cohesion which is more difficult to cut.

Surprisingly, it has now been found that the present method, for certain milk protein materials, can even be carried out without the presence of phosphate material, and a homogenous mixture can be formed and a good fibrous product obtained without problems.

In a particular embodiment, therefore, in the method described above the protein material comprises a milk protein material selected from powdered milk, whey protein and caseinate (in particular food-grade alkali metal or ammonium caseinate), and the method is carried out in the absence of a phosphate material.

This is because it has been found that the abovementioned materials contain either little calcium per se (such as alkali metal or ammonium caseinate, in particular sodium caseinate, and whey protein) or relatively small amounts of free calcium ions (such as powdered milk), and that in such a case good results are obtained even if the phosphate is omitted. One possible explanation for this is that materials of this type undergo a preparation process in which the calcium which is present is substantially removed (alkali metal or ammonium caseinate and whey protein) and/or the calcium is bonded in some way (powdered milk).

Since this subject also has independent inventive value, the method which can be used for this selection of materials is repeated below in the form of an independent claim.

Method for the preparation of a meat substitute product which comprises protein, wherein:
1) a protein material, a hydrocolloid which precipitates with metal cations and water are added to one another,
2) the composition from step 1) is formed into a homogenous mixture,
3) the mixture from 2) is mixed with a solution of a metal cation with a valency of at least 2, in order to form a fibrous product,
4) fibrous product is isolated,
characterized in that
5) the protein material comprises a milk protein material selected from the group consisting of powdered milk, whey protein and caseinate.

The latter-mentioned caseinate is expediently alkali metal or ammonium caseinate of food-grade quality.

The abovementioned series of milk protein materials forms, within the range of these materials, a selection which successfully leads to a product which can be used with success without phosphate. The digesting action of the phosphate discussed above is absent in these cases; nevertheless, the product obtained is readily suitable for consumption.

The particular embodiments which are described in the dependent claims of the present application, where they do not relate to the use of a phosphate material, are also of value in the "phosphate-free" method described above, i.e. the subject matter of claims 9-14, 21-22 is also deemed to be incorporated in the independently formulated method described above, in the form of particular embodiments.

The fibrous product which is obtained with the aid of the method according to the invention is expediently packaged after it has been shaped, isolated and finished as appropriate. A suitable packaging method is a vacuum-packaging method in which the product is placed into plastic packaging, for example made from polyethylene, under a vacuum and the packaging is sealed. Other packaging methods which can be used in this field may also be employed.

Before or after it has been packaged, the fibrous product may be subjected to a preserving treatment, such as pasteurization or sterilization. Pasteurization will in many cases be sufficient (for example at 62.8-65.5° C. for 30 min). In addition to pasteurization, it is also possible to use other preservation techniques, such as the addition of preservatives or stabilizers (Na ascorbate, benzoic acid), pH adjustment, etc.

The invention also relates to a meat substitute product which is obtained with the aid of the method described above.

Finally, the invention relates to a ready to consume meat substitute product which is obtained by culinary processing of the meat substitute product obtained according to the invention.

The product which is obtained with the aid of the method can be cooked in the oven, grilled, poached, smoked and the like without problems; it can also be converted into snacks, sausages or the like. With regard to snacks, it should be noted that they may be savoury, for which purpose the flavourings required can be used. However, in view of the dairy nature of the starting materials, the fibrous product which is obtained using the method according to the invention is also eminently suitable for forming a sweet dessert-type product.

The fibrous product is a meat or fish substitute product or a savoury or sweet dessert-like snack, in which the fibres formed adhere to one another naturally. The appearance of the products obtained is of a culinary nature, the colour is white and the fibres have an appearance similar to that of meat fibres. After processing by baking, braising, smoking, microwave heating or other treatment, it has a true meat or fish appearance and sensation in the mouth or a fibrous dessert sensation if a material which has been/can be made sweet is used.

The homogenous mixture which is formed in the method generally contains 0.1 to 50% by weight of protein material, such as milk protein or products derived therefrom, preferably 1 to 40% by weight, based on dry matter.

The hydrocolloid which precipitates with metal cations, such as for example sodium alginate, is present in an amount of from 0.1 to 10% by weight, in particular 1 to 5% by weight; the phosphate or polyphosphate is present in an amount of from 0.1 to 1.5% by weight, all percentages relating to the total weight of the homogenous mixture which is prepared in order to form the fibrous meat substitute product.

The solution used to form fibres, which is a solution of a metal cation with a valency of at least 2 as described above, generally has a concentration of from 0.01 to 15% by weight, preferably 0.05 to 10% by weight.

The strength of the fibre, which is related to the sensation in the mouth when a bite is taken, is affected by the salt concentration. For example, a higher salt concentration results in a stronger fibre.

After the formation of the homogenous mixture, which takes place at a temperature of 20 to 90° C., in particular 30 to 90° C. and more particularly 50° C., the homogenous mixture is held at this temperature and the solution of a metal cation with a valency of at least 2, for example a calcium chloride solution, is added at approximately the same temperature.

The salt solution is added with stirring, generally gradually.

The salt solution for the precipitation of the fibres will generally contain 0.01 to 15% by weight of salt, for example $CaCl_2$ or Ca acetate. The $CaCl_2$ concentration is advantageously selected to lie in the range between 0.5 and 8% by weight; it is preferable for the concentration to be no higher than 4% by weight.

The total amount of salt solution will typically be added over the course of 0.5 to 5 minutes, in particular 1 minute for a batch size of 1 kg.

The addition is expediently effected by spraying a salt solution onto the homogenous mixture which is at a relatively high temperature; the salt solution will preferably be at a temperature which corresponds to the temperature of the homogenous mixture.

The homogenous mixture may contain fat, such as milk fat originating from the milk from which the protein was separated. In this case, the fat content may be between 1 and 6% by weight, more particularly between 2.5 and 5% by weight, based on the total weight of the homogenous mixture.

Obviously, if a protein product in which there is no fat (anymore) is used, fat can be added to the homogenous mixture. In this case, it is possible to choose from vegetable and animal fats; it will be expedient to use a saturated or unsaturated vegetable fat. Mixtures of fats can also be used.

Furthermore, colourings and flavourings can be added to the homogenous mixture.

After the fibrous product has been formed, it is thoroughly washed in order to remove residues of metal cations, and the excess moisture is also removed, for example by pressing. The finished product may, for example, be vacuum-packed, after which pasteurization takes place in order to further consolidate the product and also to obtain a good shelf life. Vacuum-packing has the further advantage that the structure of the product is improved further through compression of the fibres.

After washing and pressing, the fibrous product obtained has a residual moisture content of from 1 to 80% by weight, in particular 40 to 60% by weight. However, levels which are higher and lower than these particular levels are possible, depending on what is desired.

The invention will now be explained with reference to a number of non-limiting examples.

In the experiments, sodium alginate (Kelco DMB) was used as hydrocolloid which precipitates with metal cations; the precipitation solution used contained 4% by weight of $CaCl_2$ in water.

The phosphate material used was sodium polyphosphate $(NaPO_3)_n$ where $n \sim 25$. All the percentages are based on weight, unless otherwise indicated.

EXAMPLE I

Cheese Curd as Starting Material

A mixture of 600 grams of curd (Maasdam curd (45+% fat in dry matter), calcium content: 533 mg/100 g, moisture content 63.4%) and 600 ml of water with a temperature of 55° C. and 12 grams of sodium polyphosphate $(NaPO_3)_n$ where $n \sim 25$ is prepared. The mixture is transferred to a high-speed mixer. 40 Grams of sodium alginate (Kelco, Manugel DMB) and 600 ml of water are added with continuous mixing. The mixture prepared is sprayed with 600 ml of a 4% strength by weight calcium chloride ($CaCl_2$) solution with continuous stirring. The ratio between cheese curd weight and the total weight of water is in this case 1 to approximately 3. During stirring, a fibre is formed and is removed from the residual liquid. After washing and pressing into the desired shape, a meat substitute with a structure resembling chicken and good cohesion is obtained. After pasteurization of the end product, the abovementioned method results in a product with a long shelf life.

EXAMPLE II

Cheese as Starting Material

An amount of 600 grams (50+% fat in dry matter) of cheese of the Maasdam type which has been ripened for 5 weeks (calcium content: 786 mg/100 grams, moisture content 39.5%) in grated form is mixed with 12 grams of sodium polyphosphate and 600 ml of water at approximately 55° C. 40 Grams of sodium alginate (Kelco DMB) and 600 ml of water at 55° C. are added to this more or less homogenous mass in a high-speed mixer with continuous mixing. The thick mass formed is gradually mixed with 600 ml of a 4% strength by weight calcium chloride solution until fibre formation is complete. The fibres formed are removed and are washed in ample water in order to remove the excess calcium chloride. The fibrous mass is pressed into the desired shape, packaged and pasteurized. The meat substitute obtained in this way has a moisture content of 58 to 68%, a pleasant cheesy taste and a short fibre structure.

EXAMPLE III

Sodium Caseinate as Starting Material

The method started from 85 grams of sodium caseinate. (DMV International, sodium caseinate) with a calcium content of 76 mg/100 grams, a protein content of 90% and moisture content of 5%. The sodium caseinate was dissolved in 600 ml of water at 45° C. 2 grams of sodium polyphosphate were added, followed by 110 grams of butter. After mixing to form a homogenous mixture, 30 grams of sodium alginate and 600 ml of warm water were added with intensive mixing. The mixture obtained was treated with 600 ml of a 4% strength by weight calcium chloride solution until a long, strong fibre is obtained. After washing, pressing, flavouring and pasteurizing, this meat substitute product with a chicken structure and chicken flavour had a water content of 68-78%.

The advantage of using sodium caseinate is that there is no need for there to be whey-processing facilities onsite.

EXAMPLE IV

Whey-Protein Concentrate as Starting Material 125 grams of whey-protein concentrate (Arla, Lacprodan 80, calcium content: 374 mg/100 grams, moisture content 5.5%) with a protein content of 82% is dissolved in 600 grams of water at 45° C. and mixed with 2 grams of sodium polyphosphate and 110 grams of butter. After pressing/mixing, 40 grams of sodium alginate and 600 ml of water at 45° C. are added to the mixture with intensive stirring. The mixture obtained is combined with 600 ml of a 4% strength by weight calcium chloride solution. After washing and pressing, the meat product obtained is flavoured. After the product has been vacuum-packed and pasteurized, the result is a meat substitute with good cooking properties and a chicken-meat structure. The end product has a moisture content of 70-75%.

In a separate test, the abovementioned whey-protein concentrate was dissolved in water and then subjected to a denaturation treatment by heating for 10 minutes at 95° C. This was followed by cooling to 45° C. and then the test was continued as described above. The result of the test was similar to the result of the original test described above; in this way, it was possible to limit the protein losses via the washing water.

EXAMPLE V

Powdered Milk as Starting Material

The milk protein used is skimmed milk powder (calcium content: 1160 mg/100 grams, moisture content: 4%, protein content: 30%). An amount of 250 grams was dissolved in 600 ml of water to which 4 grams of sodium polyphosphate and 110 grams of butter were added. Then, 40 grams of sodium alginate and 600 ml of water were added to this mass. After treatment of the emulsion obtained with 600 ml of a 4% calcium chloride solution, a pleasant white fibre is obtained. Washing, pressing, flavouring, packaging and pasteurization results in a pleasant product with properties similar to those of meat. Without flavouring, the product has a neutral flavour similar to that of milk.

The above formulation which is based on powdered milk uses 4 grams of sodium polyphosphate. However, if the amount of calcium which is present is taken into consideration, it has been found that this amount can be increased to 8 grams, since, as with the other raw materials, there is an excess of phosphate material in the mixture.

Table 1 shows an overview of the tests carried out as well as the most important parameters.

In the examples discussed above, in the case of powdered milk, whey protein and sodium caseinate, it is possible to dispense with the use of a phosphate material yet still obtain an acceptable product, although the products which are prepared with phosphate material achieve slightly better scores in quality assessments.

In the case of powdered milk, it is generally also possible, by high pasteurization of the powdered milk solution, to obtain a good product with the advantage of lower protein losses in the washing water.

TABLE 1

Summary of tests carried out

| Raw material | Algi-nate (g) | Phos-phate (g) | phos-phate (mmol) | Calcium in the raw material (mmol) | Net weight (g) | Weight of end product (g) | pH | Calcium (mg/100 g) | Cl (%) | Fat (%) | Fat dm | Moisture (%) | Ash (%) | Ash on dry | Calcium IN (g) | Calcium OUT (g) | Δ Calcium (g) |
|---|---|---|---|---|---|---|---|---|---|---|---|---|---|---|---|---|---|
| Maasdam curd (45+) | 40 | 12 | 117.6 | 79.8 | 1103 | 679 | 5.45 | 1010 | 0.2 | 11.2 | 38.6 | 71.0 | 3.2 | 11.0 | 3.2 | 7.0 | 3.8 |
| 50+ cheese, Maasdam type | 40 | 12 | 117.6 | 117.2 | 1274 | 751 | 5.52 | 1020 | 0.3 | 22.0 | 50.8 | 56.7 | 3.5 | 8.1 | 4.7 | 7.7 | 3.0 |
| Sodium caseinate | 30 | 2 | 19.6 | 1.50 | 997 | 613 | 6.13 | 634 | 0.2 | 13.1 | 44.6 | 70.6 | 2.0 | 6.8 | 0.06 | 3.9 | 3.8 |
| WPC | 40 | 2 | 19.6 | 11.7 | 1027 | 645 | 5.83 | 568 | 0.2 | 13.2 | 52.2 | 74.7 | 1.9 | 7.5 | 0.47 | 3.7 | 3.2 |
| Powdered milk | 40 | 4 | 39.2 | 72.3 | 983 | 561 | 5.58 | 1060 | 0.2 | 13.5 | 38.4 | 64.8 | 3.3 | 9.4 | 2.9 | 5.9 | 3.1 |

Calcium In and Out is understood as meaning the quantity of calcium in the raw material (In) and in the end product (Out).

The 600 ml of $CaCl_2$ added contained approximately 8.7 grams of $Ca^{2+}$. The final column of the table shows how many grams of calcium of these 8.7 grams were taken up by the fibre (out - in).

The invention claimed is:

1. Method for the preparation of a meat substitute product which comprises protein, wherein:
   a) a protein material, alginate and water are combined,
   b) the composition from step a) is formed into a homogenous mixture,
   c) the homogeneous mixture from b) is mixed with a solution of a metal cation with a valency of at least 2, in order to form a fibrous product,
   d) the fibrous product is isolated,
wherein the protein material comprises a milk protein material, and the homogeneous mixture of milk protein material, alginate, and water is formed in step b) in the presence of an amount of a calcium complex-forming agent.

2. Method according to claim 1, wherein a mixture of the protein material and water is made, the calcium complex-forming agent is added to this mixture and then the alginate is introduced.

3. Method according to claim 1, wherein the calcium complex-forming agent is a phosphate material.

4. Method according to claim 3, wherein the phosphate material is selected from alkali metal and ammonium salts of phosphoric acid or polyphosphoric acid.

5. Method according to claim 4, wherein the phosphate material is sodium polyphosphate $(NaPO_3)_n$, wherein n is about 25.

6. Method according to claim 1, wherein the amount of the calcium complex-forming agent is at least sufficient to form a complex with free calcium ions which are present.

7. Method according to claim 3, wherein the amount of phosphate material is 0.1-1.5% by weight, based on the total of all the constituents of the homogenous mixture.

8. Method according to claim 1, wherein the alginate is present in an amount of 0.1-10% by weight, based on the total of all the constituents of the homogenous mixture.

9. Method according to claim 8, wherein the alginate is sodium alginate.

10. Method according to claim 1, wherein the pH of the homogenous mixture of protein, alginate, calcium complex-forming agent and water is set to a value in the range from 4-7.

11. Method according to claim 1, wherein to prepare a product with a meat-type structure starting from milk protein material, the pH is set to a value between 5.0 and 7.0.

12. Method according to claim 1, wherein to prepare a product with a fish-type structure starting from milk protein material, the pH is set to a value between 4.5 and 6.0.

13. Method according to claim 1, wherein a finishing material is selected from the group consisting of flavouring, colouring and vegetable or animal fat, vegetable or animal protein, and a mixture of two or more said finishing materials is added to the homogenous mixture which has been formed.

14. Method according to claim 1, wherein the fibrous product, after the fibrous product has been formed and isolated, is pasteurized.

15. Method according to claim 1, wherein the fibrous product is packaged.

16. Meat substitute product obtained using the method according to claim 1.

17. Savoury or sweet snack obtained by processing a fibrous product obtained by the method according to claim 1.

18. Ready to consume meat substitute product obtained by culinary processing of a product according to claim 16.

19. Method according to claim 1, wherein the milk protein material is selected from the group consisting of:
   curd from cheesemaking
   cheese
   powdered milk
   whey protein
   alkali metal, alkaline-earth metal and ammonium caseinate; and combinations thereof.

20. Method according to claim 4, wherein the phosphate material is selected from the group consisting of disodium hydrogen phosphate, sodium hexametaphosphate and trisodium phosphate, and combinations thereof.

* * * * *